(12) United States Patent
Sharavanan et al.

(10) Patent No.: US 8,119,822 B2
(45) Date of Patent: Feb. 21, 2012

(54) IONIC LIQUIDS IN THE PREPARATION OF POMS

(75) Inventors: Karthikeyan Sharavanan, Mannheim (DE); Kathrin Wissel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 457 days.

(21) Appl. No.: 12/440,833

(22) PCT Filed: Sep. 7, 2007

(86) PCT No.: PCT/EP2007/059360
§ 371 (c)(1),
(2), (4) Date: Mar. 11, 2009

(87) PCT Pub. No.: WO2008/031760
PCT Pub. Date: Mar. 20, 2008

(65) Prior Publication Data
US 2009/0275724 A1      Nov. 5, 2009

(30) Foreign Application Priority Data

Sep. 12, 2006   (EP) ..................... 06120507

(51) Int. Cl.
*C08G 2/18* (2006.01)
*C08L 59/04* (2006.01)
*C08K 3/26* (2006.01)

(52) U.S. Cl. ........................................ 549/368

(58) Field of Classification Search .................. 549/368
See application file for complete search history.

(56) References Cited

U.S. PATENT DOCUMENTS

| | | |
|---|---|---|
| 2,994,687 A | 8/1961 | Goodman et al. |
| 4,339,569 A | 7/1982 | Sugio et al. |
| 4,355,153 A | 10/1982 | Radici et al. |
| 2003/0018104 A1 | 1/2003 | Mours et al. |

FOREIGN PATENT DOCUMENTS

| | | |
|---|---|---|
| DE | 1161421 | 1/1964 |
| DE | 1495228 | 2/1969 |
| DE | 1720358 | 4/1972 |
| DE | 3018898 | 11/1980 |
| DE | 3147309 | 6/1983 |
| DE | 3628561 | 3/1988 |
| DE | 4423617 | 1/1996 |
| DE | 10202838 | 8/2003 |
| EP | 128739 | 12/1984 |
| EP | 129369 | 12/1984 |
| EP | 678535 | 10/1995 |
| EP | 678535 A1 * | 10/1995 |
| GB | 1426299 | 2/1976 |
| WO | WO-0158974 | 8/2001 |
| WO | WO-2006007596 | 1/2006 |
| WO | WO-2006045579 | 5/2006 |

OTHER PUBLICATIONS

SO3H-functionalized ionic liquid as efficient, green and reusable acidic catalyst system for oligomerization of olefins, Gu et al., Catalyst Communications 4 (2003) 597-601.*

Masamoto, "Modern Polyacetals," Prog. Polym. Sci., vol. 18, pp. 1-84, 1993.

The International Preliminary Report on Patentability (IPRP) for International Application PCT/EP2007/059360, mailed on Apr. 16, 2009.

* cited by examiner

*Primary Examiner* — James J Seidleck
*Assistant Examiner* — Peter A Salamon
(74) *Attorney, Agent, or Firm* — Connolly Bove Lodge & Hutz LLP

(57) ABSTRACT

Process for preparing polyoxymethylenes by polymerization of the monomers a) in the presence of cationically active initiators b) and, if appropriate in the presence of regulators c) and subsequent deactivation d) and discharge from the reactor, wherein at least one ionic liquid is used as initiator b).

3 Claims, No Drawings

IONIC LIQUIDS IN THE PREPARATION OF POMS

CROSS REFERENCE TO RELATED APPLICATIONS

This application is a National Stage of PCT/EP2007/059360 filed Sep. 7, 2007 which in turn claims priority from European Application 06120507.6 filed Sep. 12, 2006, the entire contents of which are incorporated herein by reference.

DESCRIPTION

The invention relates to an improved process for preparing polyoxymethylenes.

It is known that oxymethylene polymers can be prepared by continuous bulk polymerization of the monomers in the presence of cationically active initiators. This polymerization is frequently carried out in kneaders or extruders. The temperatures employed can be such that the oxymethylene polymer formed is obtained either in solid form (DE-A 1 161 421, DE-A 1 495 228, DE-A 1 720 358, DE-A 3 018 898) or as a melt (DE-A 3 147 309). The work-up of the polymer obtained in solid form is known, see: DE-A 3 147 309, DE-A 3 628 561, EP-A 678 535, EP-A 699 965 and DE-A 4 423 617.

In bulk polymerization, various process variants are prior art, including batch polymerization in pans, continuous polymerization in kneader reactors at temperatures below the melting point or polymerization at temperatures above the melting point of trioxane in an extruder (see WO 01/58974).

The preparation by means of suspension or precipitation polymerization using cationic initiators is generally known. In particular, the polymer formed should not be soluble in the solvent used here, so that the polymer can be separated off more easily.

In both bulk and precipitation polymerization, initiators are added to start the polymerization.

Typical cationic initiators are Brönsted or Lewis acids, for example perchloric acid, trifluoromethanesulfonic acid or boron trifluoride (Prog. Polym. Sci. Vol. 18, 1-84, 1993).

Heteropolyacids as initiators are known from, for example, WO 2006/045579.

Compounds which all have a vapor pressure of >0 are thus known from the prior art. Since most processes also encompass a work-up or recovery of the monomers, the vapor pressure of the initiators is problematical; the monomers in the recirculated streams can be contaminated with residues of the initiator. For this reason, the presence of the cationic compounds interferes in these aspects of the process. The same applies to the introduction of monomers before the polymerization. In this respect, it is desirable to keep the amounts used very low.

It was therefore an object of the present invention to provide an improved process which has the following advantages over the prior art:
the initiator has an unmeasurable vapor pressure and thus does not interfere in the individual process steps,
degradation products of the initiator can act as formaldehyde scavengers (degradation product of POM or formed in the stabilization of the chain ends). The compounds used can thus have a double function. The addition of further FA scavengers can be reduced and sometimes even avoided,
the initiator compound can be metered in as a pure substance, dispensing with a solvent.

We have accordingly found a process for preparing POMs by polymerization of the monomers a) in the presence of cationically active initiators b) and, if appropriate in the presence of regulators c) and subsequent deactivation d) and discharge from the reactor, wherein at least one ionic liquid is used as initiator b).

Preferred embodiments may be found in the subordinate claims.

The process can in principle be carried out in any reactors having a high mixing action, for example pans, ploughshare mixers, tube reactors, list reactors, kneaders, stirred reactors, extruders and belt reactors.

The POM polymers formed are known per se to those skilled in the art and are described in the literature.

These polymers generally have at least 50 mol % of recurring —CH$_2$O— units in the main polymer chain.

The homopolymers are generally prepared by polymerization of monomers a) such as formaldehyde or trioxane, preferably in the presence of suitable catalysts.

For the purposes of the invention, preference is given to polyoxymethylene copolymers, in particular ones which comprise not only the recurring —CH$_2$O— units but also up to 50 mol %, preferably from 0.1 to 20 mol %, in particular from 0.3 to 10 mol % and very particularly preferably from 2 to 6 mol %, of recurring units

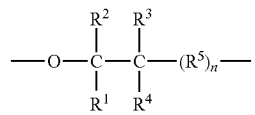

where $R^1$ to $R^4$ are each, independently of one another, a hydrogen atom, a $C_1$-$C_4$-alkyl group or a halogen-substituted alkyl group having from 1 to 4 carbon atoms and $R^5$ is a —CH$_2$— or —CH$_2$O— group, a $C_1$-$C_4$-alkyl- or $C_1$-$C_4$-haloalkyl-substituted methylene group or a corresponding oxymethylene group and n is from 0 to 3. These groups can advantageously be introduced into the copolymers by ring opening of cyclic ethers. Preferred cyclic ethers are those of the formula

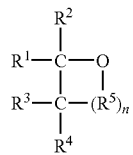

where $R^1$ to $R^5$ and n are as defined above. Mention may be made, purely by way of example, of ethylene oxide, 1,2-propylene oxide, 1,2-butylene oxide, 1,3-butylene oxide, 1,3-dioxane, 1,3-dioxolane and 1,3-dioxepane as cyclic ethers and also linear oligoformals or polyformals such as polydioxolane or polydioxepane as comonomers.

Likewise suitable are oxymethylene terpolymers which are prepared, for example, by reaction of trioxane, one of the above-described cyclic ethers and a third monomer, preferably bifunctional compounds of the formula

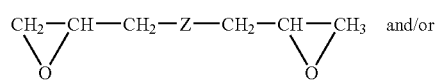

and/or

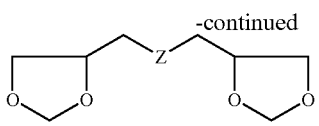

where Z is a chemical bond, —O—, —ORO— (R=$C_1$-$C_8$-alkylene or $C_3$-$C_8$-cycloalkylene).

Preferred monomers of this type are ethylene diglycide, diglycidyl ether and diethers derived from glycidyls and formaldehyde, dioxane or trioxane in a molar ratio of 2:1 and also diethers derived from 2 mol of glycidyl compounds and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to name only a few examples.

End-group-stabilized polyoxymethylene polymers which have C—C or —O—$CH_3$ bonds at the ends of the chains are particularly preferred.

The preferred polyoxymethylene copolymers have melting points of at least 150° C. and molecular weights (weight average) $M_w$ in the range from 5000 to 300 000, preferably from 7000 to 250 000.

Particular preference is given to POM copolymers having a polydispersity ($M_w/M_n$) of from 2 to 15, preferably from 3 to 12, particularly preferably from 4 to 9. The measurements are generally carried out by means of (GPC) SEC (size exclusion chromatography); the $M_n$ (number average molecular weight) is generally determined by means of (GPC) SEC (size exclusion chromatography).

Particularly preferred POM copolymers have a bimodal molecular weight distribution in which the low molecular weight fraction has a molecular weight of from 500 to 20 000, preferably from 1000 to 15 000, and is present in proportions by area of from 1 to 15%, preferably from 8 to 10%, in the distribution graph of w(log M) versus log M.

The crude polyoxymethylenes obtainable by the process of the invention preferably have a residual formaldehyde content in accordance with VDA 275 in the granular material of not more than 3%, preferably not more than 1%, more preferably not more than 0.05%.

The mean particle size ($d_{50}$) of the POM polymers is preferably from 0.5 to 20 mm, preferably from 0.75 to 15 mm and in particular from 1 to 7 mm.

To a person skilled in the art, a $d_{50}$ is generally the particle size at which 50% of the particles have a smaller particle size and 50% have a larger particle size. The $d_{10}$ and $d_{90}$ values indicated are defined analogously.

The $d_{10}$ is preferably less than 1 mm, in particular 0.75 mm and very particularly preferably less than 0.5 mm.

Preferred $d_{90}$ values are less than 30 mm and in particular less than 20 mm and very particularly preferably less than 10 mm.

Determination of the Particle Size Distribution:

The particle size distribution was determined by dividing the material into different sieve fractions by means of a set of standard sieves (analytical sieves in accordance with DIN 4188) and these fractions were weighed. For example, $d_{50}$=1 mm means that 50% by weight of the sample has a particle size of less than or equal to 1 mm.

The process of the invention is preferably employed for the homopolymerization and copolymerization of trioxane. However, it is in principle possible to use any of the above-described monomers, for example also tetroxane or (para) formaldehyde, as monomer a).

The monomers, for example, trioxane, are preferably fed in the molten state, generally at temperatures of from 60 to 120° C.

The temperature of the reaction mixture during the metered addition is preferably from 62 to 114° C., in particular from 70 to 90° C.

The molecular weights of the polymer can, if appropriate, be set to the desired values by means of the regulators d) customary in (trioxane) polymerization. Possible regulators are acetals or formals of monohydric alcohols, the alcohols themselves and the small amounts of water which function as chain transfer agents and whose presence can generally never be avoided completely. The regulators are used in amounts of from 10 to 10 000 ppm, preferably from 100 to 1000 ppm.

As initiators b) (also referred to as catalysts), a least one ionic liquid is used in the (trioxane) polymerization according to the invention. The catalysts (initiators) are used in amounts of from about 0.01 to 10 000 ppm, preferably from 0.01 to 500 ppm and in particular from 0.01 to 200 ppm. In general, it is advisable to add the catalyst in dilute form, preferably in concentrations of from 0.005 to 5% by weight. Solvents which can be used here are inert compounds such as aliphatic, cycloaliphatic hydrocarbons, e.g. cyclohexane, halogenated aliphatic hydrocarbons, glycol ethers, etc. Other ionic liquids having a low acidity can also be used as solvents. However, the catalyst is particularly preferably metered in without solvent.

Monomers a), initiators b) and, if appropriate, regulators c) can be premixed in any desired way before they are introduced into the polymerization reactor or can be introduced into the reactor separately from one another. Furthermore, the components a), b) and/or c) can comprise sterically hindered phenols to stabilize them, as described in EP-A 129369 or EP-A 128 739.

To achieve a greater flexibility in the desired $M_w$ of the POM polymer, it has been found to be advantageous to dissolve the regulator c) in small amounts of solvent and subsequently mix it with the monomers or comonomers and meter it in this form.

In a particularly preferred embodiment, the polymerization is carried out as a precipitation polymerization (depending on the solubility of the individual components, also referred to as suspension polymerization) in a solvent in which the polyoxymethylene homopolymer or copolymer formed is largely insoluble. For the present purposes, "largely" insoluble means that the polymer precipitates at and above a degree of polymerization of at least 4.

As solvents, use is made of, in particular, inert compounds, for example aliphatic hydrocarbons such as propane, butane, pentane, isooctane, n-hexane, n-heptane, n-octane, isooctane and also cycloaliphatic hydrocarbons such as cyclohexane or cycloheptane or cyclopentane, which may optionally bear heteroatoms as substituents.

Suitable aromatic hydrocarbons are those having from at least 6 to 30 carbon atoms, with preference being given to nitrobenzene, toluene, benzene.

Further suitable halogenated hydrocarbons are dichloromethane, chloroform, dichloroethane and trichloroethane.

Further suitable inert solvents are ethers such as dioxane or THF and also triglyme (triethylene glycol dimethyl ether).

The solvent preferably has a temperature from 50 to 250° C., more preferably from 55 to 180° C. and in particular from 60 to 130° C., at the beginning of the reaction (metered addition). The metered addition of the cocatalyst c) is preferably carried out after addition of the monomers a) or before addition of the catalyst b).

Preference is given to working under inert gas conditions, preferably under $N_2$, at pressures of from 1 to 5 bar abs, preferably from 1 to 2 bar abs, before commencement of the reaction.

Ionic liquids of any type are used as initiators according to the invention.

For the purposes of the present invention, ionic liquids are preferably (A) salts of the general formula (I)

$$[A]_n^+[Y]^{n-} \quad (I),$$

where n is 1, 2, 3 or 4, $[A]^+$ is a quaternary ammonium cation, an oxonium cation, a sulfonium cation or a phosphonium cation and $[Y]^{n-}$ is a monovalent, divalent, trivalent or tetravalent anion;

(B) mixed salts of the general formulae (II)

$$[A^1]^+[A^2]^+[Y]^{n-}, \text{ where } n=2; \quad (IIa)$$

$$[A^1]^+[A^2]^+[A^3]^+[Y]^{n-}, \text{ where } n=3; \text{ or} \quad (IIb)$$

$$[A^1]^+[A^2]^+[A^3]^+[A^4]^+[Y]^{n-}, \text{ where } n=4 \text{ and} \quad (IIc)$$

where $[A^1]^+$, $[A^2]^+$, $[A^3]^+$ and $[A^4]^+$ are selected independently from among the group mentioned for $[A]^+$ and $[Y]^{n-}$ is as defined under (A); or (C) mixed salts of the general formulae (III)

$$[A^1]^+[A^2]^+[A^3]^+[M^1]^+[Y]^{n-}, \text{ where } n=4; \quad (IIIa)$$

$$[A^1]^+[A^2]^+[M^1]^+[M^2]^+[Y]^{n-}, \text{ where } n=4; \quad (IIIb)$$

$$[A^1]^+[M^1]^+[M^2]^+[M^3]^+[Y]^{n-}, \text{ where } n=4; \quad (IIIc)$$

$$[A^1]^+[A^2]^+[M^1]^+[Y]^{n-}, \text{ where } n=3; \quad (IIId)$$

$$[A^1]^+[M^1]^+[M^2]^+[Y]^{n-}, \text{ where } n=3; \quad (IIIe)$$

$$[A^1]^+[M^1]^+[Y]^{n-}, \text{ where } n=2; \quad (IIIf)$$

$$[A^1]^+[A^2]^+[M^4]^{2+}[Y]^{n-}, \text{ where } n=4; \quad (IIIg)$$

$$[A^1]^+[M^1]^+[M^4]^{2+}[Y]^{n-}, \text{ where } n=4; \quad (IIIh)$$

$$[A^1]^+[M^5]^{3+}[Y]^{n-}, \text{ where } n=4; \text{ or} \quad (IIIi)$$

$$[A^1]^+[M^4]^{2+}[Y]^{n-}, \text{ where } n=3 \text{ and} \quad (IIIj)$$

where $[A^1]^+$, $[A^2]^+$ and $[A^3]^+$ are selected independently from among the groups mentioned for $[A]^+$, $[Y]^{n-}$ is as defined under (A) and $[M^1]^+$, $[M^2]^+$, $[M^3]^+$ are monovalent metal cations, $[M^4]^{2+}$ are divalent metal cations and $[M^5]^{3+}$ are trivalent metal cations.

The ionic liquids preferably have a melting point of less than 180° C. The melting point is more preferably in the range from −50° C. to 150° C., more preferably in the range from −20° C. to 120° C. and even more preferably below 100° C.

The ionic liquids used according to the invention are organic compounds, i.e. at least one cation or anion of the ionic liquid comprises an organic radical.

Compounds suitable for the formation of the cation $[A]^+$ of ionic liquids are known, for example, from DE 102 02 838 A1. Thus, such compounds can comprise oxygen, phosphorus, sulfur or in particular nitrogen atoms, for example at least one nitrogen atom, preferably 1-10 nitrogen atoms, particularly preferably 1-5 nitrogen atoms, very particularly preferably 1-3 nitrogen atoms and in particular 1-2 nitrogen atoms. If appropriate, further heteroatoms such as oxygen, sulfur or phosphorus atoms can also be comprised. The nitrogen atom is a suitable carrier of the positive charge in the cation of the ionic liquid, from which a proton or an alkyl radical can then go over in equilibrium to the anion to produce an electrically neutral molecule.

If the nitrogen atom is the carrier of the positive charge in the cation of the ionic liquid, a cation can firstly be produced by quaternization of the nitrogen atom of, for instance, an amine or nitrogen heterocycle in the synthesis of the ionic liquids. Quaternization can be effected by alkylation of the nitrogen atom. Depending on the alkylation reagent used, salts having different anions are obtained. In cases in which it is not possible to form the desired anion in the quaternization itself, this can be brought about in a further step of the synthesis. Starting from, for example, an ammonium halide, the halide can be reacted with a Lewis acid, forming a complex anion from the halide and Lewis acid. As an alternative, replacement of a halide ion by the desired anion is possible. This can be achieved by addition of a metal salt with precipitation of the metal halide formed, by means of an ion exchanger or by displacement of the halide ion by a strong acid (with liberation of the hydrogen halide). Suitable methods are described, for example, in Angew. Chem. 2000, 112, pp. 3926-3945, and the references cited therein.

Suitable alkyl radicals by means of which the nitrogen atom in the amines or nitrogen heterocycles can, for example, be quaternized are $C_1$-$C_{18}$-alkyl, preferably $C_1$-$C_{10}$-alkyl, particularly preferably $C_1$-$C_6$-alkyl and very particularly preferably methyl. The alkyl group can be unsubstituted or have one or more identical or different substituents.

Preference is given to compounds which comprise at least one five- or six-membered heterocycle, in particular a five-membered heterocycle, which has at least one nitrogen atom and also, if appropriate, an oxygen or sulfur atom. Particular preference is likewise given to compounds which comprise at least one five- or six-membered heterocycle which has one, two or three nitrogen atoms and a sulfur or oxygen atom, very particularly preferably compounds having two nitrogen atoms. Further preference is given to aromatic heterocycles.

Particularly preferred compounds have a molecular weight of less than 1000 g/mol, very particularly preferably of less than 500 g/mol.

Furthermore, preference is given to cations selected from among the compounds of the formulae (IVa) to (IVw),

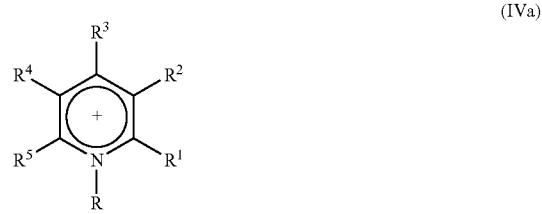

(IVa)

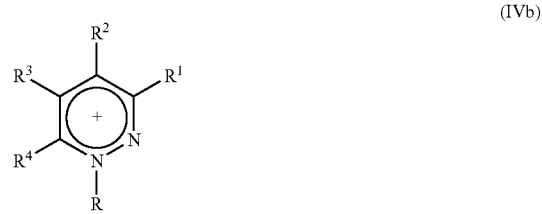

(IVb)

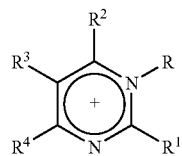 (IVc)
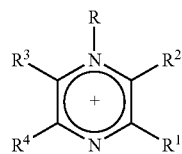 (IVd)
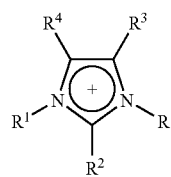 (IVe)
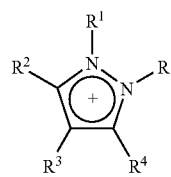 (IVf)
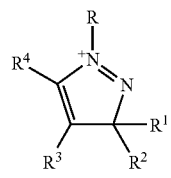 (IVg)
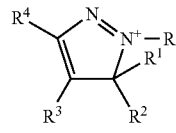 (IVg')
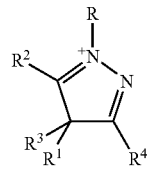 (IVh)
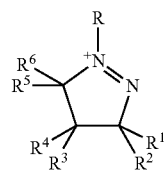 (IVi)
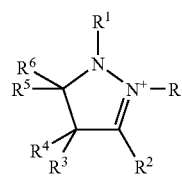 (IVj)
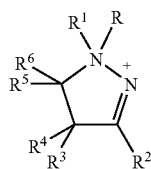 (IVj')
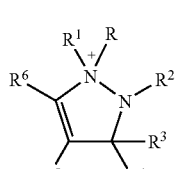 (IVk)
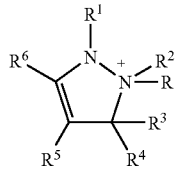 (IVk')
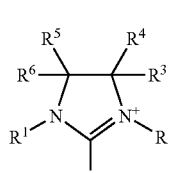 (IVl)
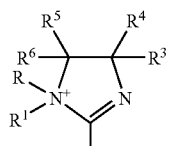 (IVm)
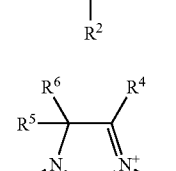 (IVm')
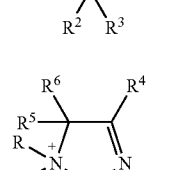 (IVn)
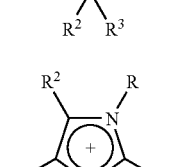 (IVn')
(IVo)

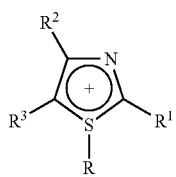
(IVo′)

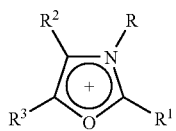
(IVp)

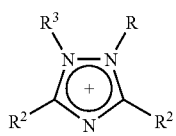
(IVq)

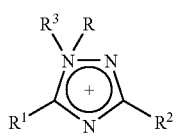
(IVq′)

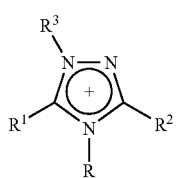
(IVq″)

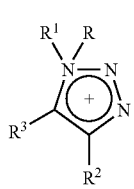
(IVr)

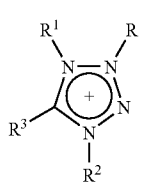
(IVr′)

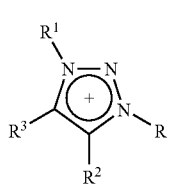
(IVr″)

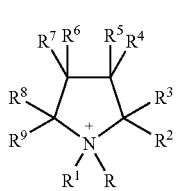
(IVs)

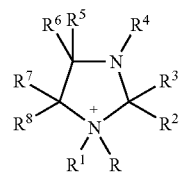
(IVt)

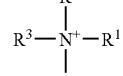
(IVu)

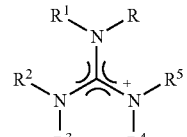
(IVv)

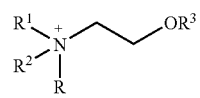
(IVw)

and oligomers comprising these structures.

Further suitable cations are compounds of the general formulae (IVx) and (IVy)

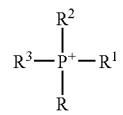
(IVx)

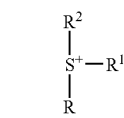
(IVy)

and oligomers comprising these structures.

In the abovementioned formulae (IVa) to (IVy), the radical R is hydrogen or a carbon-comprising organic, saturated or unsaturated, acyclic or cyclic, aliphatic, aromatic or araliphatic radical which has from 1 to 20 carbon atoms and may be unsubstituted or be interrupted or substituted by from 1 to 5 heteroatoms or functional groups; and the radicals $R^1$ to $R^9$ are each, independently of one another, hydrogen, a sulfo group or a carbon-comprising organic, saturated or unsaturated, acyclic or cyclic, aliphatic, aromatic or araliphatic radical which has from 1 to 20 carbon atoms and may be unsubstituted or be interrupted or substituted by from 1 to 5 heteroatoms or functional groups, where the radicals $R^1$ to $R^9$ which are bound to a carbon atom (and not to a heteroatom) in the formulae (IV) mentioned above are additionally able to be halogen or a functional group; or two adjacent radicals from the group consisting of $R^1$ to $R^9$ may together also form a divalent, carbon-comprising organic, saturated or unsaturated, acyclic or cyclic, aliphatic, aromatic or araliphatic radical which has from 1 to 30 carbon atoms and may be unsubstituted or be interrupted or substituted by from 1 to 5 heteroatoms or functional groups.

In the definitions of the radicals R and $R^1$ to $R^9$, possible heteroatoms are in principle all heteroatoms which are able to formally replace a —$CH_2$— group, a —CH= group, a —C- group or a =C= group. If the carbon-comprising radical comprises heteroatoms, then oxygen, nitrogen, sulfur, phosphorus and silicon are preferred. Preferred groups are, in particular, —O—, —S—, —SO—, —$SO_2$—, —NR'—, —N=, —PR'—, —$PR'_2$ and —$SiR'_2$—, where the radicals R' are the remaining part of the carbon-comprising radical. In the cases in which the radicals $R^1$ to $R^9$ are bound to a carbon atom (and not a heteroatom) in the abovementioned formula (IV), they can also be bound directly via the heteroatom.

Suitable functional groups are in principle all functional groups which can be bound to a carbon atom or a heteroatom. Suitable examples are —OH (hydroxy), =O (in particular as carbonyl group), —$NH_2$(amino), —NHR', —$NR_2'$=NH (imino), —COOH (carboxy), —$CONH_2$ (carboxamide), —$SO_3H$ (sulfo) and —CN (cyano). Functional groups and heteroatoms can also be directly adjacent, so that combinations of a plurality of adjacent atoms, for instance —O— (ether), —S— (thioether), —COO— (ester), —CONH— (secondary amide) or —CONR'— (tertiary amide), are also comprised, for example di-($C_1$-$C_4$-alkyl)amino, $C_1$-$C_4$-alkyloxycarbonyl or $C_1$-$C_4$-alkyloxy. The radicals R' are the remaining part of the carbon-comprising radical.

As halogens, mention may be made of fluorine, chlorine, bromine and iodine.

The radical R is preferably
  unbranched or branched $C_1$-$C_{18}$-alkyl which may be unsubstituted or substituted by one or more hydroxy, halogen, phenyl, cyano, $C_1$-$C_6$-alkoxycarbonyl and/or $SO_3H$ and has a total of from 1 to 20 carbon atoms, for example methyl, ethyl, 1-propyl, 2-propyl, 1-butyl, 2-butyl, 2-methyl-1-propyl(isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, benzyl, 3-phenylpropyl, 2-hydroxyethyl, 2-cyanoethyl, 2-(methoxycarbonyl)ethyl, 2-(ethoxycarbonyl)ethyl, 2-(n-butoxycarbonyl)ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl, undecylfluoroisopentyl, 6-hydroxyhexyl and propylsulfonic acid;
  glycols, butylene glycols and oligomers thereof having from 1 to 100 units and hydrogen or a $C_1$-$C_8$-alkyl radical as end group, for example $R^A$O—(CHR$^B$—$CH_2$—O)$_n$—CHR$^B$—$CH_2$— or $R^A$O—($CH_2CH_2CH_2CH_2O$)$_n$—$CH_2CH_2CH_2CH_2O$— where $R^A$ and $R^B$ are each preferably hydrogen, methyl or ethyl and n is preferably 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;
  vinyl;
  1-propen-1-yl, 1-propen-2-yl and 1-propen-3-yl; and
  N,N-di-$C_1$-$C_6$-alkylamino such as N,N-dimethylamino and N,N-diethylamino.

The radical R is particularly preferably unbranched and unsubstituted $C_1$-$C_{18}$-alkyl, such as methyl, ethyl, 1-propyl, 1-butyl, 1-pentyl, 1-hexyl, 1-heptyl, 1-octyl, 1-decyl, 1-dodecyl, 1-tetradecyl, 1-hexadecyl, 1-octadecyl, in particular methyl, ethyl, 1-butyl and 1-octyl, or $CH_3O$—($CH_2CH_2O$)$_n$—$CH_2CH_2$— and $CH_3CH_2O$—($CH_2CH_2O$)$_n$—$CH_2CH_2$— where n is 0 to 3.

Preference is given to the radicals $R^1$ to $R^9$ each being, independently of one another,
  hydrogen;
  halogen;
  a functional group;
  $C_1$-$C_{18}$-alkyl which may optionally be substituted by functional groups, aryl, alkyl, aryloxy, alkyloxy, halogen, heteroatoms and/or heterocycles and/or be interrupted by one or more oxygen and/or sulfur atoms and/or one or more substituted or unsubstituted imino groups;
  $C_2$-$C_{18}$-alkenyl which may optionally be substituted by functional groups, aryl, alkyl, aryloxy, alkyloxy, halogen, heteroatoms and/or heterocycles and/or be interrupted by one or more oxygen and/or sulfur atoms and/or one or more substituted or unsubstituted imino groups;
  $C_6$-$C_{12}$-aryl which may optionally be substituted by functional groups, aryl, alkyl, aryloxy, alkyloxy, halogen, heteroatoms and/or heterocycles;
  $C_5$-$C_{12}$-cycloalkyl which may optionally be substituted by functional groups, aryl, alkyl, aryloxy, alkyloxy, halogen, heteroatoms and/or heterocycles;
  $C_5$-$C_{12}$-cycloalkenyl which may optionally be substituted by functional groups, aryl, alkyl, aryloxy, alkyloxy, halogen, heteroatoms and/or heterocycles; or
  a five- or six-membered, oxygen-, nitrogen- and/or sulfur-comprising heterocycle which may optionally be substituted by functional groups, aryl, alkyl, aryloxy, alkyloxy, halogen, heteroatoms and/or heterocycles; or
two adjacent radicals together with the atoms to which they are bound form
  an unsaturated, saturated or aromatic ring which may optionally be substituted by functional groups, aryl, alkyl, aryloxy, alkyloxy, halogen, heteroatoms and/or heterocycles and may optionally be interrupted by one or more oxygen and/or sulfur atoms and/or one or more substituted or unsubstituted imino groups.

$C_1$-$C_{18}$-alkyl which may optionally be substituted by functional groups, aryl, alkyl, aryloxy, alkyloxy, halogen, heteroatoms and/or heterocycles is preferably methyl, ethyl, 1-propyl, 2-propyl, 1-butyl, 2-butyl, 2-methyl-1-propyl(isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, 2-ethylhexyl, 2,4,4-trimethylpentyl, 1,1,3,3-tetramethylbutyl, 1-nonyl, 1-decyl, 1-undecyl, 1-dodecyl, 1-tridecyl, 1-tetradecyl, 1-pentadecyl, 1-hexadecyl, 1-heptadecyl, 1-octadecyl, cyclopentylmethyl, 2-cyclopentylethyl, 3-cyclopentylpropyl, cyclohexylmethyl, 2-cyclohexylethyl, 3-cyclohexylpropyl, benzyl(phenylmethyl), diphenylmethyl (benzhydryl), triphenylmethyl, 1-phenylethyl, 2-phenylethyl, 3-phenylpropyl, α,α-dimethylbenzyl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, methoxy, ethoxy, formyl, 1,3-dioxolan-2-yl, 1,3-dioxan-2-yl, 2-methyl-1,3-dioxolan-2-yl, 4-methyl-1,3-dioxolan-2-yl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, acetyl, $C_nF_{2(n-a)+(1-b)}H_{2a+b}$ where n is from 1 to 30, $0 \leq a \leq n$ and b=0 or 1 (for example $CF_3$, $C_2F_5$, $CH_2CH_2$—$C_{(n-2)}F_{2(n-2)+1}$, $C_6F_{13}$, $C_8F_{17}$, $C_{10}F_{21}$, $C_{12}F_{25}$), chloromethyl, 2-chloroethyl, trichloromethyl, 1,1-dimethyl-2-chloroethyl, methoxymethyl, 2-butoxyethyl, diethoxymethyl, diethoxyethyl, 2-isopropoxyethyl, 2-butoxypropyl, 2-octyloxyethyl, 2-methoxyisopropyl, 2-(methoxycarbonyl)ethyl, 2-(ethoxycarbonyl)ethyl, 2-(n-butoxycarbonyl)ethyl, butylthiomethyl, 2-dodecylthioethyl, 2-phenylthioethyl, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-dioxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-dioxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

$C_2$-$C_{18}$-alkenyl which may optionally be substituted by functional groups, aryl, alkyl, aryloxy, alkyloxy, halogen, heteroatoms and/or heterocycles and/or be interrupted by one or more oxygen and/or sulfur atoms and/or one or more substituted or unsubstituted imino groups is preferably vinyl, 2-propenyl, 3-butenyl, cis-2-butenyl, trans-2-butenyl or $C_nF_{2(n-a)-(1-b)}H_{2a-b}$ where $n \leq 30$, $0 \leq a \leq n$ and b=0 or 1.

$C_6$-$C_{12}$-aryl which may optionally be substituted by functional groups, aryl, alkyl, aryloxy, alkyloxy, halogen, heteroatoms and/or heterocycles is preferably phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2-nitrophenyl, 4-nitrophenyl, 2,4-dinitrophenyl, 2,6-dinitrophenyl, 4-dimethylaminophenyl, 4-acetylphenyl, methoxyethylphenyl, ethoxymethylphenyl, methylthiophenyl, isopropylthiophenyl or tert-butylthiophenyl or $C_6F_{(5-a)}H_a$ where $0 \leq a \leq 5$.

$C_5$-$C_{12}$-cycloalkyl which may optionally be substituted by functional groups, aryl, alkyl, aryloxy, alkyloxy, halogen, heteroatoms and/or heterocycles is preferably cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, $C_nF_{2(n-a)-(1-b)}H_{2a-b}$ where $n \leq 30$, $0 \leq a \leq n$ and b=0 or 1, or a saturated or unsaturated bicyclic system such as norbornyl or norbornenyl.

$C_5$-$C_{12}$-cycloalkenyl which may optionally be substituted by functional groups, aryl, alkyl, aryloxy, alkyloxy, halogen, heteroatoms and/or heterocycles is preferably 3-cyclopentenyl, 2-cyclohexenyl, 3-cyclohexenyl, 2,5-cyclohexadienyl or $C_nF_{2(n-a)-3(1-b)}H_{2a-3b}$ where $n \leq 30$, $0 \leq a \leq n$ and b=0 or 1.

A five- or six-membered, oxygen-, nitrogen- and/or sulfur-comprising heterocycle which may optionally be substituted by functional groups, aryl, alkyl, aryloxy, alkyloxy, halogen, heteroatoms and/or heterocycles is preferably furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl or difluoropyridyl.

If two adjacent radicals together form an unsaturated, saturated or aromatic ring which may optionally be substituted by functional groups, aryl, alkyl, aryloxy, alkyloxy, halogen, heteroatoms and/or heterocycles and may optionally be interrupted by one or more oxygen and/or sulfur atoms and/or one or more substituted or unsubstituted imino groups, they preferably form 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 3-oxa-1,5-pentylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

If the abovementioned radicals comprise oxygen and/or sulfur atoms and/or substituted or unsubstituted imino groups, the number of oxygen and/or sulfur atoms and/or imino groups is not subject to any restrictions. In general, there will be no more than 5 in the radical, preferably no more than 4 and very particularly preferably no more than 3.

If the abovementioned radicals comprise heteroatoms, there is generally at least one carbon atom, preferably at least two carbon atoms, between any two heteroatoms.

Particular preference is given to the radicals $R^1$ to $R^9$ each being, independently of one another, hydrogen;

unbranched or branched $C_1$-$C_{18}$-alkyl which may be unsubstituted or substituted by one or more hydroxy, halogen, phenyl, cyano, $C_1$-$C_6$-alkoxycarbonyl and/or $SO_3H$ and has a total of from 1 to 20 carbon atoms, for example methyl, ethyl, 1-propyl, 2-propyl, 1-butyl, 2-butyl, 2-methyl-1-propyl(isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, benzyl, 3-phenylpropyl, 2-hydroxyethyl, 2-cyanoethyl, 2-(methoxycarbonyl)ethyl, 2-(ethoxycarbonyl)ethyl, 2-(n-butoxy-carbonyl)ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl, undecylfluoroisopentyl, 6-hydroxyhexyl and propylsulfonic acid;

glycols, butylene glycols and oligomers thereof having from 1 to 100 units and hydrogen or a $C_1$-$C_8$-alkyl radical as end group, for example $R^4O$—$(CHR^B$—$CH_2$—

O)$_n$—CHR$^B$—CH$_2$— or R$^A$O—(CH$_2$CH$_2$CH$_2$CH$_2$O)$_n$—CH$_2$CH$_2$CH$_2$CH$_2$O— where R$^A$ and R$^B$ are each preferably hydrogen, methyl or ethyl and n is preferably 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;

vinyl;

1-propen-1-yl, 1-propen-2-yl and 1-propen-3-yl; and

N,N-di-C$_1$-C$_6$-alkylamino, such as N,N-dimethylamino and N,N-diethylamino.

Very particular preference is given to the radicals R$^1$ to R$^9$ each being, independently of one another, hydrogen or C$_1$-C$_{18}$-alkyl such as methyl, ethyl, 1-butyl, 1-pentyl, 1-hexyl, 1-heptyl, 1-octyl, phenyl, 2-hydroxyethyl 2-cyanoethyl, 2-(methoxycarbonyl)ethyl, 2-(ethoxycarbonyl)ethyl, 2-(n-butoxycarbonyl)ethyl, N,N-dimethylamino, N,N-diethylamino, chlorine or CH$_3$O—(CH$_2$CH$_2$O)$_n$—CH$_2$CH$_2$— and CH$_3$CH$_2$O—(CH$_2$CH$_2$O)$_n$—CH$_2$CH$_2$— where n is 0-3.

Very particularly preferred pyridinium ions (IVa) are those in which one of the radicals R$^1$ to R$^5$ is methyl, ethyl or chlorine and the remaining radicals R$^1$ to R$^5$ are each hydrogen;

R$^3$ is dimethylamino and the remaining radicals R$^1$, R$^2$, R$^4$ and R$^5$ are each hydrogen;

all radicals R$^1$ to R$^5$ are hydrogen;

R$^2$ is carboxy or carboxamide and the remaining radicals R$^1$, R$^2$, R$^4$ and R$^5$ are each hydrogen; or R$^1$ and R$^2$ or R$^2$ and R$^3$ are 1,4-buta-1,3-dienylene and the remaining radicals R$^1$, R$^2$, R$^4$ and R$^5$ are each hydrogen;

and in particular those in which

R$^1$ to R$^5$ are each hydrogen; or one of the radicals R$^1$ to R$^5$ is methyl or ethyl and the remaining radicals R$^1$ to R$^5$ are each hydrogen.

As very particularly preferred pyridinium ions (IVa), mention may be made of 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium and 1-(1-octyl)-2-methyl-3-ethyl-pyridinium, 1-(1-dodecyl)-2-methyl-3-ethylpyridinium, 1-(1-tetradecyl)-2-methyl-3-ethylpyridinium and 1-(1-hexadecyl)-2-methyl-3-ethylpyridinium.

Very particularly preferred pyridazinium ions (IVb) are those in which

R$^1$ to R$^4$ are each hydrogen; or one of the radicals R$^1$ to R$^4$ is methyl or ethyl and the remaining radicals R$^1$ to R$^4$ are each hydrogen.

Very particularly preferred pyrimidinium ions (IVc) are those in which

R$^1$ is hydrogen, methyl or ethyl and R$^2$ to R$^4$ are each, independently of one another, hydrogen or methyl; or R$^1$ is hydrogen, methyl or ethyl, R$^2$ and R$^4$ are each methyl and R$^3$ is hydrogen.

Very particularly preferred pyrazinium ions (IVd) are those in which

R$^1$ is hydrogen, methyl or ethyl and R$^2$ to R$^4$ are each, independently of one another, hydrogen or methyl;

R$^1$ is hydrogen, methyl or ethyl, R$^2$ and R$^4$ are each methyl and R$^3$ is hydrogen;

R$^1$ to R$^4$ are each methyl; or

R$^1$ to R$^4$ are each hydrogen.

Very particularly preferred imidazolium ions (IVe) are those in which

R$^1$ is hydrogen, methyl, ethyl, 1-propyl, 1-butyl, 1-pentyl, 1-hexyl, 1-octyl, 2-hydroxyethyl or 2-cyanoethyl, and R$^2$ to R$^4$ are each, independently of one another, hydrogen, methyl or ethyl.

As very particularly preferred imidazolium ions (IVe), mention may be made of 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium and 1-(prop-1-en-3-yl)-3-methylimidazolium.

Very particularly preferred pyrazolium ions (IVf), (IVg) and (IVg') are those in which R$^1$ is hydrogen, methyl or ethyl and R$^2$ to R$^4$ are each, independently of one another, hydrogen or methyl.

Very particularly preferred pyrazolium ions (IVh) are those in which

R$^1$ to R$^4$ are each, independently of one another, hydrogen or methyl.

Very particularly preferred 1-pyrazolinium ions (IVi) are those in which

R$^1$ to R$^6$ are each, independently of one another, hydrogen or methyl.

Very particularly preferred 2-pyrazolinium ions (IVj) and (IVj') are those in which R$^1$ is hydrogen, methyl, ethyl or phenyl and R$^2$ to R$^6$ are each, independently of one another, hydrogen or methyl.

Very particularly preferred 3-pyrazolinium ions (IVk) and (IVk') are those in which R$^1$ and R$^2$ are each, independently of one another, hydrogen, methyl, ethyl or phenyl and R$^3$ to R$^6$ are each, independently of one another, hydrogen or methyl.

Very particularly preferred imidazolinium ions (IVl) are those in which
R$^1$ and R$^2$ are each, independently of one another, hydrogen, methyl, ethyl, 1-butyl or phenyl, R$^3$ and R$^4$ are each, independently of one another, hydrogen, methyl or ethyl and R$^5$ and R$^6$ are each, independently of one another, hydrogen or methyl.

Very particularly preferred imidazolinium ions (IVm) and (IVm') are those in which
R$^1$ and R$^2$ are each, independently of one another, hydrogen, methyl or ethyl and R$^3$ to R$^6$ are each, independently of one another, hydrogen or methyl.

Very particularly preferred imidazolinium ions (IVn) and (IVn') are those in which
R$^1$ to R$^3$ are each, independently of one another, hydrogen, methyl or ethyl and R$^4$ to R$^6$ are each, independently of one another, hydrogen or methyl.

Very particularly preferred thiazolium ions (IVo) and (IVo') and oxazolium ions (IVp) are those in which
R$^1$ is hydrogen, methyl, ethyl or phenyl and R$^2$ and R$^3$ are each, independently of one another, hydrogen or methyl.

Very particularly preferred 1,2,4-triazolium ions (IVq), (IVq') and (IVq'') are those in which
R$^1$ and R$^2$ are each, independently of one another, hydrogen, methyl, ethyl or phenyl and R$^3$ is hydrogen, methyl or phenyl.

Very particularly preferred 1,2,3-triazolium ions (IVr), (IVr') and (IVr'') are those in which
R$^1$ is hydrogen, methyl or ethyl and R$^2$ and R$^3$ are each, independently of one another, hydrogen or methyl or R$^2$ and R$^3$ are together 1,4-buta-1,3-dienylene.

Very particularly preferred pyrrolidinium ions (IVs) are those in which
R$^1$ is hydrogen, methyl, ethyl or phenyl and R$^2$ to R$^9$ are each, independently of one another, hydrogen or methyl.

Very particularly preferred imidazolidinium ions (IVt) are those in which
R$^1$ and R$^4$ are each, independently of one another, hydrogen, methyl, ethyl or phenyl and R$^2$ and R$^3$ and also R$^5$ to R$^8$ are each, independently of one another, hydrogen or methyl.

Very particularly preferred ammonium ions (IVu) are those in which
R$^1$ to R$^3$ are each, independently of one another, C$_1$-C$_{18}$-alkyl; or
R$^1$ and R$^2$ are together 1,5-pentylene or 3-oxa-1,5-pentylene and R$^3$ is C$_1$-C$_{18}$-alkyl, 2-hydroxyethyl or 2-cyanoethyl.

As very particularly preferred ammonium ions (IVu), mention may be made of methyltri-(1-butyl)ammonium, N,N-dimethylpiperidinium and N,N-dimethylmorpholinium.

Examples of tertiary amines from which the quaternary ammonium ions of the general formula (IVu) are derived by quaternization with the radicals R mentioned are diethyl-n-butylamine, diethyl-tert-butylamine, diethyl-n-pentylamine, diethyl-hexylamine, diethylloctylamine, diethyl(2-ethylhexyl)amine, di-n-propylbutylamine, di-n-propyl-n-pentylamine, di-n-propylhexylamine, di-n-propyloctylamine, di-n-propyl(2-ethylhexyl)amine, diisopropylethylamine, diisopropyl-n-propylamine, diisopropylbutylamine, diisopropylpentylamine, diisopropylhexylamine, diisopropyloctylamine, diisopropyl(2-ethylhexyl)amine, di-n-butylethylamine, di-n-butyl-n-propylamine, di-n-butyl-n-pentylamine, di-n-butylhexylamine, di-n-butyloctylamine, di-n-butyl(2-ethylhexyl)amine, N-n-butylpyrrolidine, N-sec-butylpyrrolidine, N-tert-butylpyrrolidine, N-n-pentylpyrrolidine, N,N-dimethylcyclohexylamine, N,N-diethylcyclohexylamine, N,N-di-n-butylcyclohexylamine, N-n-propylpiperidine, N-isopropylpiperidine, N-n-butylpiperidine, N-sec-butylpiperidine, N-tert-butylpiperidine, N-n-pentylpiperidine, N-n-butylmorpholine, N-sec-butylmorpholine, N-tert-butylmorpholine, N-n-pentylmorpholine, N-benzyl-N-ethylaniline, N-benzyl-N-n-propylaniline, N-benzyl-N-isopropylaniline, N-benzyl-N-n-butylaniline, N,N-dimethyl-p-toluidine, N,N-diethyl-p-toluidine, N,N-di-n-butyl-p-toluidine, diethylbenzylamine, di-n-propylbenzylamine, di-n-butylbenzylamine, diethylphenylamine, di-n-propylphenylamine and di-n-butylphenylamine.

Preferred quaternary ammonium salts of the general formula (IVu) are those which can be derived from the following tertiary amines by quaternization by means of the radicals R mentioned, e.g. diisopropylethylamine, diethyl-tert-butylamine, diisopropylbutylamine, di-n-butyl-n-pentylamine, N,N-di-n-butylcyclohexylamine and tertiary amines derived from pentyl isomers.

Particularly preferred tertiary amines are di-n-butyl-n-pentylamine and tertiary amines derived from pentyl isomers. A further preferred tertiary amine which has three identical radicals is triallylamine.

Very particularly preferred guanidinium ions (IVv) are those in which
R$^1$ to R$^5$ are each methyl.

As a very particularly preferred guanidinium ion (IVv) mention may be made of N,N,N',N',N'',N''-hexamethylguanidinium.

Very particularly preferred cholinium ions (IVw) are those in which
R$^1$ and R$^2$ are each, independently of one another, methyl, ethyl, 1-butyl or 1-octyl and R$^3$ is hydrogen, methyl, ethyl, acetyl, —SO$_2$OH or —PO(OH)$_2$;
R$^1$ is methyl, ethyl, 1-butyl or 1-octyl, R$^2$ is a —CH$_2$—CH$_2$—OR$^4$ group and R$^3$ and R$^4$ are each, independently of one another, hydrogen, methyl, ethyl, acetyl, —SO$_2$OH or —PO(OH)$_2$; or
R$^1$ is a —CH$_2$—CH$_2$—OR$^4$ group, R$^2$ is a —CH$_2$—CH$_2$—OR$^5$ group and R$^3$ to R$^5$ are each, independently of one another, hydrogen, methyl, ethyl, acetyl, —SO$_2$OH or —PO(OH)$_2$.

Particularly preferred cholinium ions (IVw) are those in which R$^3$ is selected from among hydrogen, methyl, ethyl, acetyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl and 14-ethoxy-5,10-oxatetradecyl.

Very particularly preferred phosphonium ions (IVx) are those in which
R$^1$ to R$^3$ are each, independently of one another, C$_1$-C$_{18}$-alkyl, in particular butyl, isobutyl, 1-hexyl or 1-octyl.

Among the abovementioned heterocyclic cations, preference is given to the pyridinium ions, pyrazolinium ions, pyrazolium ions and the imidazolinium ions and the imidazolium ions. Preference is also given to ammonium ions.

Particular preference is given to 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1- butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium, 1-(1-octyl)-2-methyl-3-ethylpyridinium, 1-(1-dodecyl)-2-methyl-3-ethylpyridinium, 1-(1-tetradecyl)-2-methyl-3-ethylpyridinium, 1-(1-hexadecyl)-2-methyl-3-ethylpyridinium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-hexyl)-3-methylimidazolium, 1-(1-octyl)-3-methylimidazolium, 1-(1-dodecyl)-3-methylimidazolium, 1-(1-tetradecyl)-3-methylimidazolium, 1-(1-hexadecyl)-3-methylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium and 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium and 1-(prop-1-en-3-yl)-3-methylimidazolium.

The metal cations $[M^1]^+$, $[M^2]^+$, $[M^3]^+$, $[M^4]^{2+}$ and $[M^5]^{3+}$ mentioned in the formulae (IIIa) to (IIIj) are generally metal cations of groups 1, 2, 6, 7, 8, 9, 10, 11, 12 and 13 of the Periodic Table. Suitable metal cations are, for example, $Li^+$, $Na^+$, $K^+$, $Cs^+$, $Mg^{2+}$, $Ca^{2+}$, $Ba^{2+}$, $Cr^{3+}$, $Fe^{2+}$, $Fe^{3+}$, $Co^{2+}$, $Ni^{2+}$, $Cu^{2+}$, $Ag^+$, $Zn^{2+}$ and $Al^{3+}$.

As anions, it is in principle possible to use all anions.
The anion $[Y]^{n-}$ of the ionic liquid is, for example, selected from among the group of halides and halogen-comprising compounds of the formulae:

F—, Cl—, Br, I—, $BF_4$—, $PF_6$—, $CF_3SO_3$—, $(CF_3SO_3)_2N$—, $CF_3CO_2$—, $CCl_3CO_2$—, CN—, SCN—, OCN— the group of sulfates, sulfites and sulfonates of the general formulae:

$SO_4^{2-}$—, $HSO_4$—, $SO_3^{2-}$—, $HSO_3$—, $R^aOSO_3$—, $R^aSO_3$— the group of phosphates of the general formulae $PO_4^{3-}$—, $HPO_4^{2-}$—, $H_2PO_4$—, $R^aPO_4^{2-}$—, $HR^aPO_4$—, $R^aR^bPO_4$— the group of phosphonates and phosphinates of the general formulae:

$R^aHPO_3$—, $R^aR^bPO_2$—, $R^aR^bPO_3$— the group of phosphites of the general formulae:

$PO_3^{3-}$—, $HPO_3^{2-}$—, $H_2PO_3$—, $R^aPO_3^{2-}$—, $R^aHPO_3$—, $R^aR^bPO_3$— the group of phosphonites and phosphinites of the general formulae:

$R^aR^bPO_2$—, $R^aHPO_2$—, $R^aR^bPO$—, $R^aHPO$— the group of carboxylic acids of the general formula:

$R^aCOO$— the group of borates of the general formulae:

$BO_3^{3-}$—, $HBO_3^{2-}$—, $H_2BO_3$—, $R^aR^bBO_3$—, $R^aHBO_3$—, $R^aBO_3^{2-}$—, $B(OR^a)(OR^b)(OR^c)(OR^d)$—, $B(HSO_4)$—, $B(R^aSO_4)$— the group of boronates of the general formulae:

$R^aBO_2^{2-}$—, $R^aR^bBO$— the group of carbonates and carbonic esters of the general formulae:

$HCO_3$—, $CO_3^{2-}$—, $R^aCO_3$— the group of silicates and silicic esters of the general formulae:

$SiO_4^{4-}$—, $HSiO_4^{3-}$—, $H_2SiO_4^{2-}$—, $H_3SiO_4$—, $R^aSiO_4^{3-}$—, $R^aR^bSiO_4^{2-}$—, $R^aR^bR^cSiO_4$—, $HR^aSiO_4^{2-}$—, $H_2R^aSiO_4$—, $HR^aR^bSiO_4$— the group of alkylsilane and arylsilane salts of the general formulae:

$R^aSiO_3^{3-}$—, $R^aR^bSiO_2^{2-}$—, $R^aR^bR^cSiO$—, $R^aR^bR^cSiO_3$—, $R^aR^bR^cSiO_2$—, $R^aR^bSiO_3^{2-}$— the group of carboximides, bis(sulfonyl)imides and sulfonylimides of the general formulae:

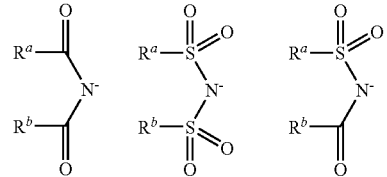

the group of methides of the general formula:

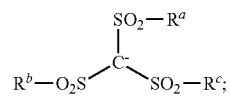

the group of alkoxides and aryloxides of the general formula:

$R^aO$—;

the group of halometallates of the general formula $[M_qHal_r]^{s-}$,
where M is a metal and Hal is fluorine, chlorine, bromine or iodine, q and r are positive integers and indicate the stoichiometry of the complex and s is a positive integer and indicates the charge on the complex;
the group of sulfides, hydrogensulfides, polysulfides, hydrogenpolysulfides and thiolates of the general formulae:

$S^{2-}$, $HS^-$, $[S_v]^{2-}$, $[HS_v]^-$, $[R^aS]^-$, where v is a positive integer from 2 to 10;
the group of complex metal ions such as $Fe(CN)_6^{3-}$, $Fe(CN)_6^{4-}$, $MnO_4$—, $Fe(CO)_4$—.

Here, $R^a$, $R^b$, $R^c$ and $R^d$ are each, independently of one another, hydrogen, $C_1$-$C_{30}$-alkyl, $C_2$-$C_{18}$-alkyl which may optionally be interrupted by one or more nonadjacent oxygen and/or sulfur atoms and/or one or more substituted or unsubstituted imino groups, $C_6$-$C_{14}$-aryl, $C_5$-$C_{12}$-cycloalkyl or a five- or six-membered, oxygen-, nitrogen- and/or sulfur-comprising heterocycle, where two of them may also together form an unsaturated, saturated or aromatic ring which may optionally be interrupted by one or more oxygen and/or sulfur atoms and/or one or more unsubstituted or substituted imino groups, where the radicals mentioned may each be additionally substituted by functional groups, aryl, alkyl, aryloxy, alkyloxy, halogen, heteroatoms and/or heterocycles.

Here, $C_1$-$C_{18}$-alkyl which may optionally be substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl.

$C_2$-$C_{18}$-Alkyl which may optionally be interrupted by one or more nonadjacent oxygen and/or sulfur atoms and/or one or more substituted or unsubstituted imino groups is, for example, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, these radicals can together form as fused-on building block, for example, 1,3-propylene, 1,4-butylene, 2-oxa-1,3-propylene, 1-oxa-1,3-propylene, 2-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of nonadjacent oxygen and/or sulfur atoms and/or imino groups is in principle not subject to any restrictions or is automatically restricted by the size of the radical or the cyclic building block. In general, there will be no more than 5 in the respective radical, preferably no more than 4 and very particularly preferably no more than 3. Furthermore, there is generally at least one carbon atom, preferably at least two carbon atoms, between any two heteroatoms.

Substituted and unsubstituted imino groups can be, for example, imino, methylimino, isopropylimino, n-butylimino or tert-butylimino.

The term "functional groups" refers, for example, to the following: carboxy, carboxamide, hydroxy, di-($C_1$-$C_4$-alkyl)amino, $C_1$-$C_4$-alkyloxycarbonyl, cyano or $C_1$-$C_4$-alkoxy. Here, $C_1$-$C_4$-alkyl is methyl, ethyl, propyl, isopropyl, n-butyl, sec-butyl or tert-butyl.

$C_6$-$C_{14}$-Aryl which may optionally be substituted by functional groups, aryl, alkyl, aryloxy, alkyloxy, halogen, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

$C_5$-$C_{12}$-Cycloalkyl which may optionally be substituted by functional groups, aryl, alkyl, aryloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl.

A five- or six-membered, oxygen-, nitrogen- and/or sulfur-comprising heterocycle is, for example, furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl, difluoropyridyl, methylthiophenyl, isopropylthiophenyl or tertbutylthiophenyl.

In a further preferred embodiment, ionic liquids which comprise an acid group, in particular an —$SO_3H$ group, as any substituent are used. Particularly preferred compounds are:

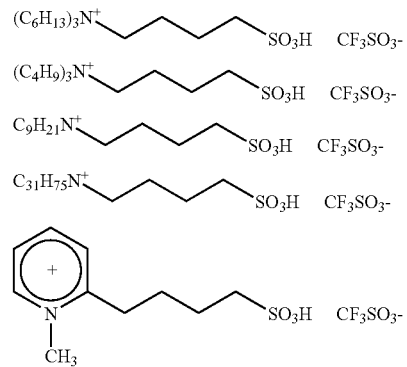

-continued

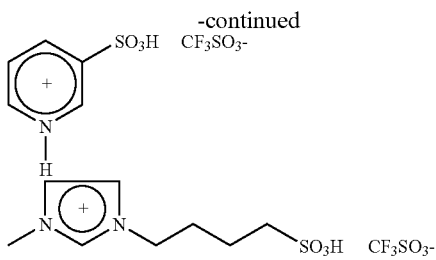

It is also possible to use mixtures of various ionic liquids in combination, with any mixing ratio being possible.

The residence time for the polymerization in the solvent (precipitation polymerization) is preferably from 0.1 to 240 min, in particular from 5 to 120 min. The polymerization is preferably carried out to a conversion of at least 30%, in particular more than 60%. Under favorable conditions, conversions of 90% and above can also be achieved; quantitative conversions up to 100% are greatly reproducible.

The polymerization mixture is preferably deactivated immediately after the polymerization, preferably without a phase change occurring.

The deactivation d) of the catalyst residues is generally effected by addition of at least one deactivator d):
a) by direct addition to the precipitated POM (in particulate form) in the polymerization apparatus, preferably the extruder, kneader, tube reactor or (cascade of) tank(s), or
b) after complete separation of the POM polymer from the solvent and subsequent treatment with gaseous deactivators, or
c) after partial removal of the solvent and addition of the deactivator to the remaining solvent which comprises the precipitated polymer, or
d) after complete separation of the polymer from the solvent and dissolution of the polymer in a suitable solvent and addition of the deactivator to the dissolved polymer.

Suitable deactivators are, for example, ammonia, aliphatic and aromatic amines, basic salts such as sodium carbonate and borax. These are usually added to the polymers in amounts of preferably up to 1% by weight.

Organic compounds of alkali or alkaline earth metals, preferably of sodium, include the corresponding salts of (cyclo) aliphatic, araliphatic or aromatic carboxylic acids having preferably up to 30 carbon atoms and preferably from 1 to 4 carboxyl groups. Examples are: alkali metal salts of formic acid, acetic acid, propionic acid, butyric acid, isobutyric acid, caprylic acid, stearic acid, cyclohexanecarboxylic acid, succinic acid, adipic acid, suberic acid, 1,10-decanedicarboxylic acid, 1,4-cyclohexanedicarboxylic acid, terephthalic acid, 1,2,3-propanetricarboxylic acid, 1,3,5-cyclohexanetricarboxylic acid, trimellitic acid, 1,2,3,4-cyclopentanetetracarboxylic acid, pyromellitic acid, benzoic acid, substituted benzoic acids, dimer acids and trimer acids and also neutral and partly neutral montan wax salts or montan wax ester salts (montanates). Salts with other types of acid radicals, e.g. alkali metal paraffin sulfonates, alkali metal olefin sulfonates and alkali metal arylsulfonates or phenoxides and alkoxides such as methoxides, ethoxides, glycolates, can also be used according to the invention.

Preference is given to using sodium salts of monocarboxylic and polycarboxylic acids, in particular aliphatic monocarboxylic and polycarboxylic acids, preferably those having from 2 to 18 carbon atoms, in particular from 2 to 6 carbon atoms, and up to four, preferably up to two, carboxyl groups, and also sodium alkoxides having preferably from 2 to 15, in particular from 2 to 8, carbon atoms. Examples of particularly preferred representatives are sodium acetate, sodium propionate, sodium butyrate, sodium oxalate, sodium malonate, sodium succinate, sodium methoxide, sodium ethoxide, sodium glyconate. Very particularly preference is given to sodium methoxide which is particularly advantageously used in an amount of 1-5 mol per mole of compound b) used. It is also possible to use mixtures of various alkali metal or alkaline earth metal compounds.

Further preferred deactivators d) are alkaline earth metal alkyls having from 2 to 30 carbon atoms in the alkyl radical. Particularly preferred metals are Li, Mg and Na, with n-butyllithium being very particularly preferred.

In the preferred melt polymerization, the addition of the deactivator is generally effected
a) by addition of the pure substance or a solution or suspension to the reaction melt,
b) by addition of the substance, preferably by means of a side extruder or stuffing screw, to the reaction melt.

Preference is given to using basic compounds having at least 2 amino functions of differing reactivity in one molecule as deactivators (d).

For the purposes of the invention, differing reactivity is a differing basicity of the nitrogens and thus a differing affinity for the cationic centre on the polyacetal. A differing basicity is generally attributable to a differing molecular environment (see also Breitmaier/Jung, Organische Chemie, Thieme Verlag 1978, pp. 374 and 375, and Beyer/Walter, Lehrbuch der organischen Chemie, Hirzel Verlag Stuttgart 1998, p. 166).

It is accordingly possible to use combinations of a primary amino function and a secondary amino function or primary and tertiary amino functions or secondary and tertiary amino functions or mixtures thereof. According to the invention, these different amino functions should be present in one molecule, with the molecular weight preferably being $\leq 400$ g/mol, in particular $\leq 200$ g/mol.

Preferred compounds d) are those of the general formula I

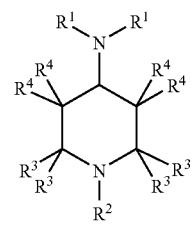

where $R^1$, $R^3$, $R^4$ and R5 are each, independently of one another, hydrogen or a $C_1$-$C_{10}$-alkyl group and
$R^2$ is hydrogen or a $C_1$-$C_{10}$-alkyl group or O—$R^5$.

Preference is given to the radicals $R^1$ to $R^5$ each being, independently of one another, hydrogen or a $C_1$-$C_4$-alkyl group such as methyl, ethyl, n-propyl, i-propyl, n-butyl, i-butyl, s-butyl, t-butyl.

Very particularly preferred deactivators d) are substituted N-comprising heterocycles, in particular derivatives of piperidine, with triacetonediamine (4-amino-2,2,6,6-tetramethylpiperidine) being particularly preferred.

The amount is preferably from 0.001 to 500 ppm by weight, preferably from 0.05 to 100 ppm by weight and in particular from 0.5 to 10 ppm by weight, based on the total reaction mixture. The molar ratio of d) to initiator b) is preferably from 0.1:1 to 50:1, in particular from 0.5:1 to 15:1 and very particularly preferably from 1:1 to 10:1; based on the amount of initiator.

The deactivators d) can also be mixed with other known termination agents.

The polymer formed can subsequently be washed with inert solvents, for example acetone or cyclohexane, and separated from the solvent by means of suitable apparatuses and if appropriate cooled.

The process of the invention gives a compact, pulverulent material, with the formation of coarse fractions as in the prior art being avoided.

In the case of a melt polymerization, a polymer having, in particular, improved stability is obtained.

The process of the invention gives polyoxymethylene homopolymers or copolymers in which the chains have from 0.001 to 30%, preferably from 0.01 to 10% and in particular from 0.1 to 2% and very particularly preferably from 0.1 to 1%, of units derived from the ionic liquids b).

Such units are preferably located at the ends of the polymer chains. The corresponding polyoxymethylene polymer can subsequently be processed further with customary additives such as stabilizers, rubbers, fillers, etc., in the usual way.

EXAMPLES

Example 1

50 g of 1,3,5-trioxane were stirred at a constant 80° C. in a glass reactor and initiator I was added (6000 ppm). A polyoxymethylene homopolymer was obtained in a yield of 88%.

(I):

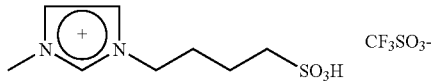

Example 2

As Example 1 but using 500 ppm of (I). The yield of POM was 93%.

Example 3

As Example 1 but using 48.65 g of 1,3,5-trioxane and 1.35 g of 1,3-dioxepane. The yield of POM was 90% with $M_w$=91 000 g/mol, $M_n$=30 000 g/mol, $M_w/M_n$=3.

Comparative Example 1

As Example 3 but using 2 ppm of $HClO_4$ in triglyme. Yield: 83%, $M_w$=60 000 g/mol, $M_n$=19 800 g/mol, $M_w/M_n$=3.

Comparative Example 2

As Comparative Example 1 but using 0.2 ppm of $HClO_4$ in triglyme. Yield: 90%, $M_w$=154 000 g/mol, $M_n$=19 700 g/mol, $M_w/M_n$=7.8.

The invention claimed is:

1. A process for preparing polyoxymethylenes by polymerization of the monomers a) in the presence of cationically active initiators b) and, if appropriate in the presence of regulators c) and subsequent deactivation d) and discharge from the reactor, wherein at least one ionic liquid of the following formulae

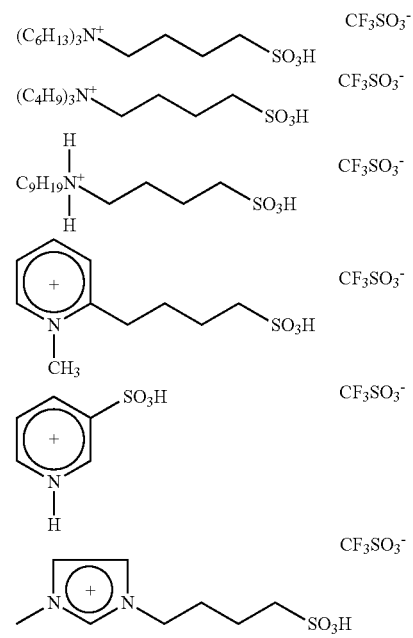

or mixtures thereof are used as initiator b).

2. The process according to claim 1, wherein the initiator is used in amounts of from 0.01 to 10,000 ppm.

3. The process according to claim 1, wherein the polymerization is carried out at temperatures of from 50 to 205° C.

* * * * *